Sept. 8, 1964 L. A. COLLINS 3,148,242

METHOD OF TELEVISION TRANSMISSION AND RECEPTION

Filed Oct. 19, 1956 5 Sheets-Sheet 1

INVENTOR.
Lee A. Collins

INVENTOR.
Lee A. Collins

INVENTOR.
Lee A. Collins

INVENTOR.
Lee A. Collins

Sept. 8, 1964 L. A. COLLINS 3,148,242

METHOD OF TELEVISION TRANSMISSION AND RECEPTION

Filed Oct. 19, 1956

5 Sheets-Sheet 5

INVENTOR.

Lee A. Collins

United States Patent Office 3,148,242
Patented Sept. 8, 1964

3,148,242
METHOD OF TELEVISION TRANSMISSION AND RECEPTION

Lee A. Collins, 2232 Talbott Ave., Louisville 5, Ky.
Filed Oct. 19, 1956, Ser. No. 618,665
2 Claims. (Cl. 178—5.2)

The present invention is a continuation-in-part of my application Serial No. 113,651, filed September 1, 1949, and now abandoned, which was rejected by the Examiner and finally by the Board of Appeals under date of September 20, 1956.

The invention relates to a novel method and means for television and other transmissions.

One object is to broadcast signals from two or more programs by interleaving the signals in extremely close sequence whereby the signals are received separately and reproduced into programs without detecting loss of visible or audible effects and for good quality reception of the program.

Another object is to broadcast several programs in extremely close sequence of one signal to another from separate colored image televising cameras whereby a colored image is received and/or whereby any one of the several color parts, from one of the television cameras, is received separately, one example being the black and white part of the image.

Other novel features of the invention will be set forth hereinafter:

Figure 6:
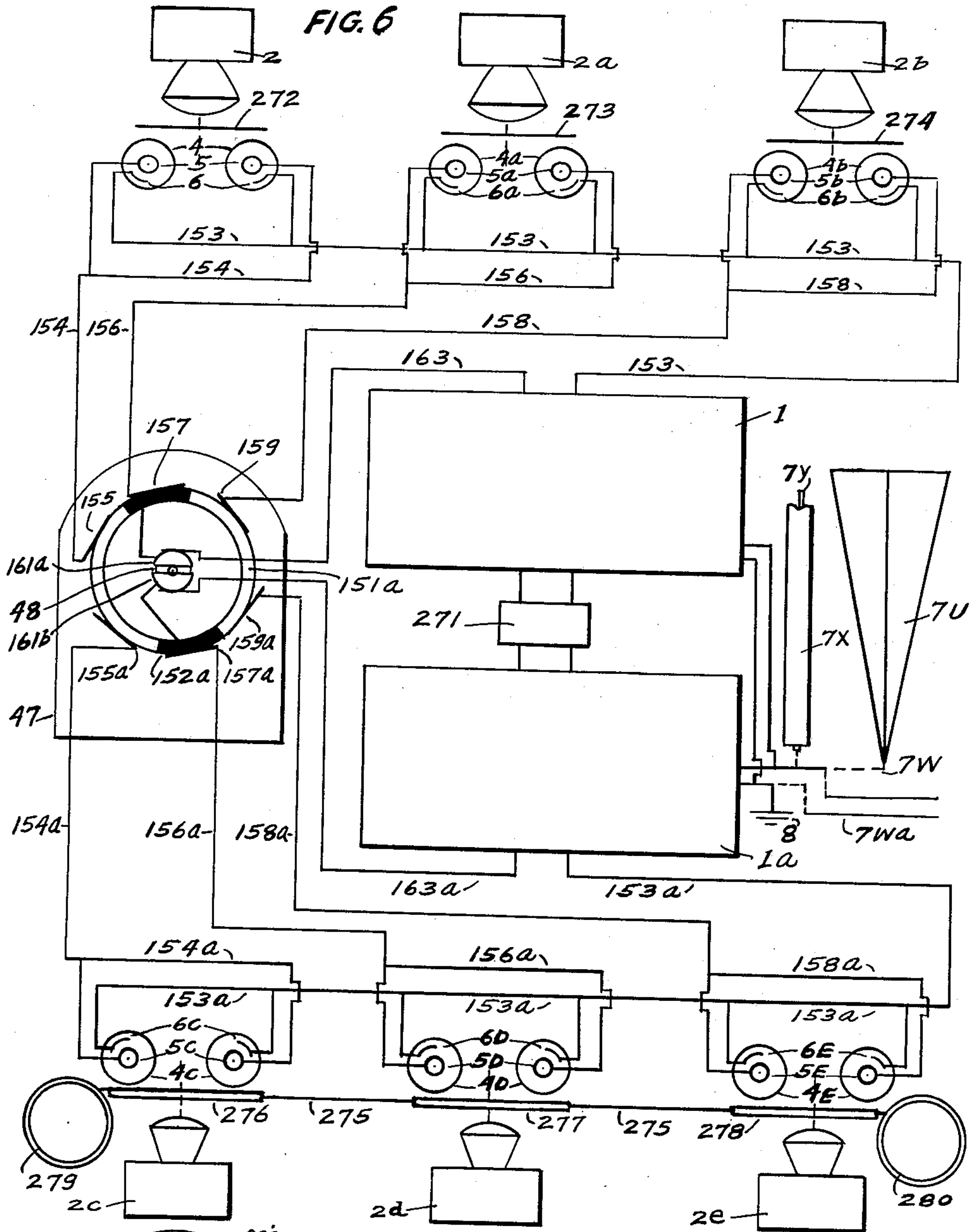
FIG. 6 is a modification of FIG. 5.
Figure 6C:
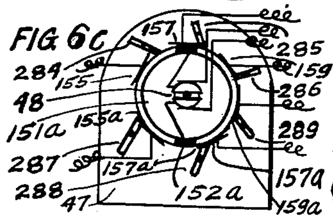
Figure 6A:
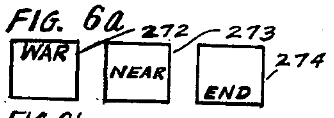
Figure 6B:
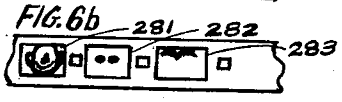

FIG. 6*a* and FIG. 6*b* show face views of images for transmitting. FIG. 6*c* shows the rotating disc for transmitters 1 and 1*a*.

Figures 7, 7B:
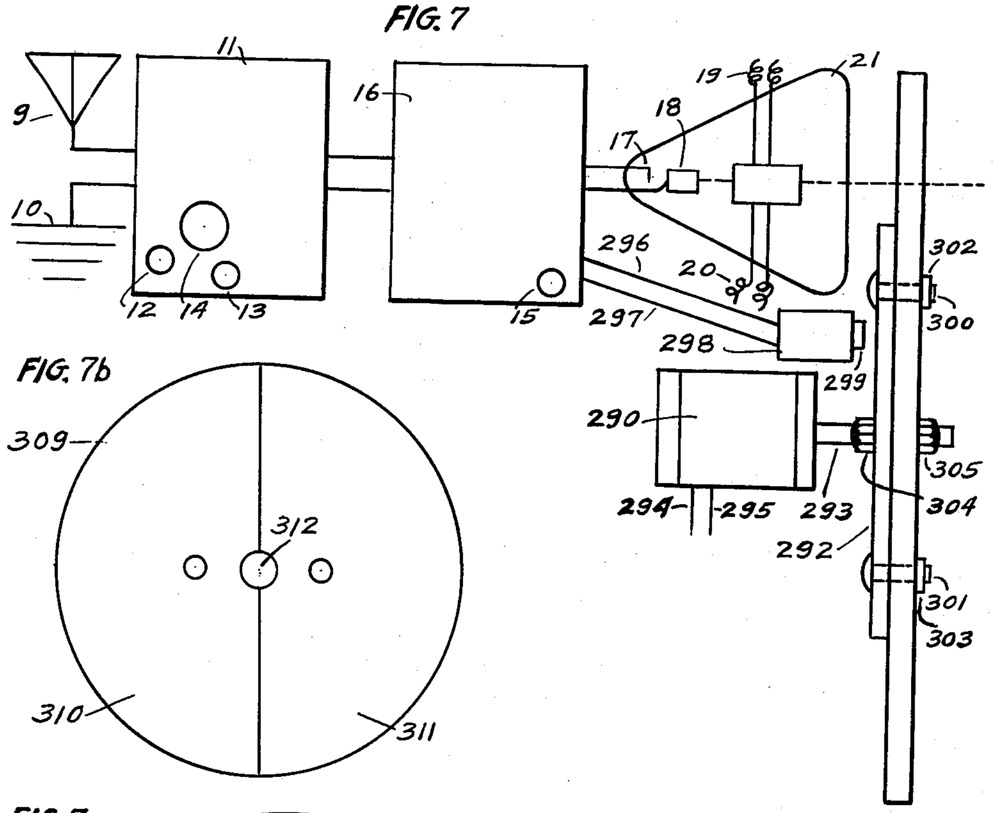

FIG. 7 shows a color receiving apparatus.

Figure 7A:
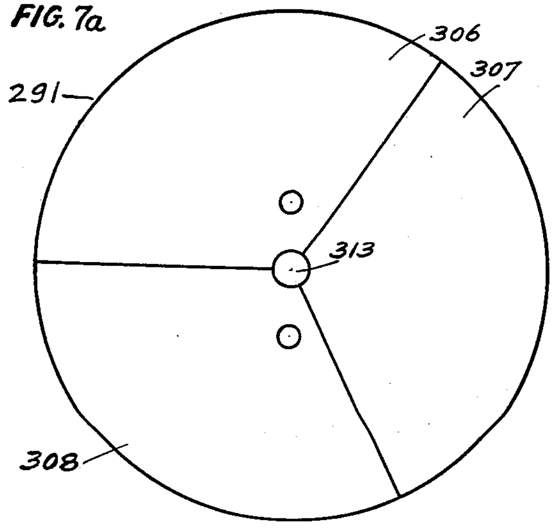

FIGURES 7*a* and 7*b* are face views of the filtering discs of FIG. 7.

Figures 8, 8A, 9:
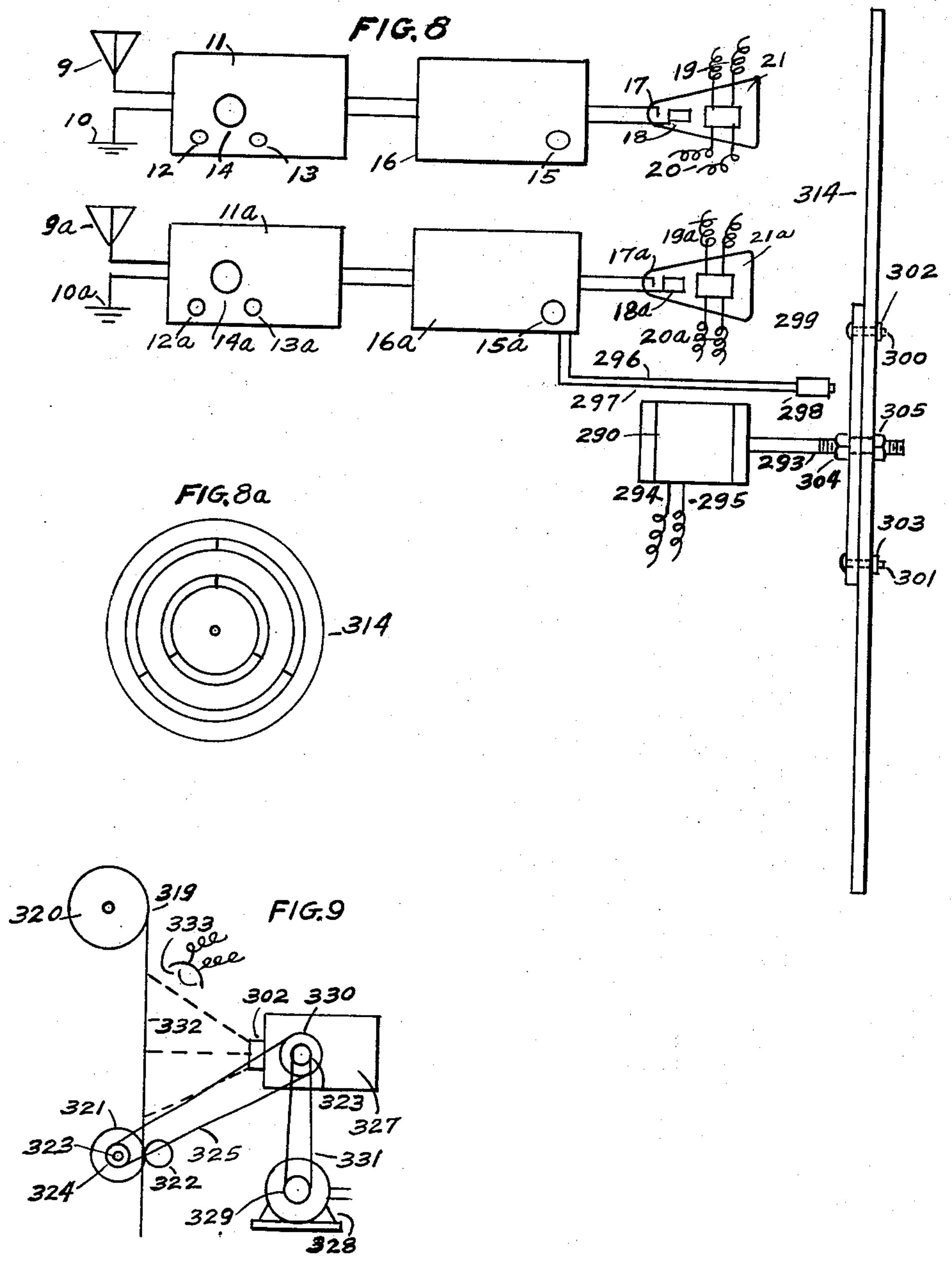

FIG. 8 shows a multiple color receiving set.

FIG. 8*a* is a face view of the disc of FIG. 8.

FIG. 9 illustrates photographing images for broadcasting.

Figures 1, 2, 3, 4:
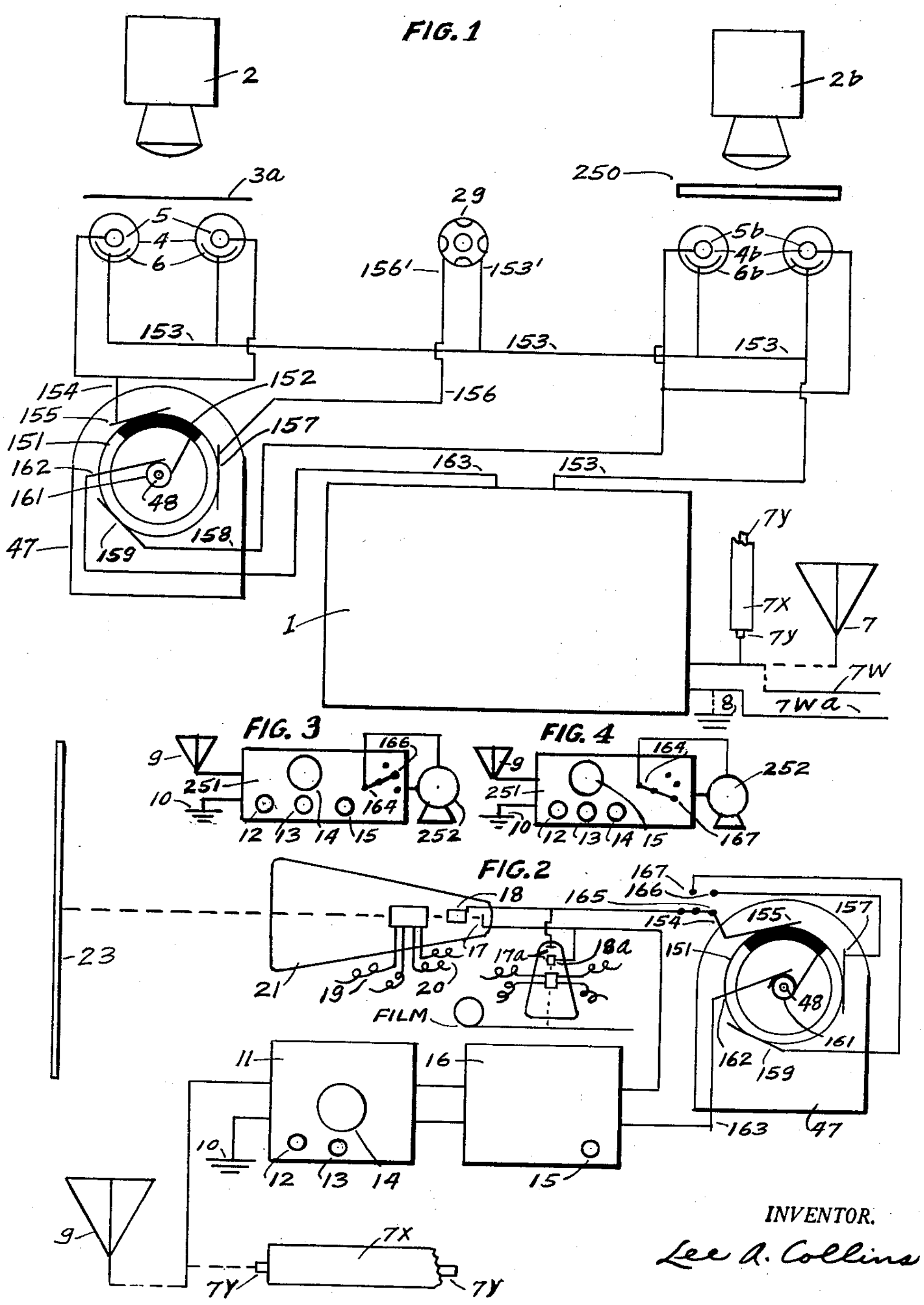
FIG. 1 shows a multiplexing system for broadcasting a newspage and sound.
FIGURES 2, 3 and 4 shows receiving apparatus for FIG. 1.

FIG. 1 shows three transmitting units transmitting newspage and sound simultaneously over a single transmitting channel by the making and breaking of their circuits to the transmitter by a fast rotating disc 151 having a metallic segment indicated by the numeral 152. The rotating disc 151 is mounted on a shaft 48 of a rotating apparatus 47. The wiring 153 is joined to each of the light sensitive elements 6 and **6*b* of photo-electric cells 4 and 4*b*, respectively, of two scanning units and leads to the input of transmitter 1; the wiring 154 joins the two ring elements 5 of photo-electric cells 4 and leads to a flat spring brush 155 engaging the disc 151; the wiring 156 joins a wiring 156¹ of a microphone 29 and leads to a flat spring brush 157 engaging the disc 151 and the wiring 153 joins another wiring 153¹ of the microphone 29; the wiring 158 joins the two ring elements 5*b* of photo-electric cells 4*b* and leads to a flat spring brush 159 engaging the disc 151. The metallic piece 152 seated in the insulated disc 151 is joined by the metallic disc 161 mounted on the shaft 48; the disc 161 is preferably insulated in mounting on the shaft 48. The brush 162 engages the disc 161 for completing a circuit through wiring 163 to transmitter 1 from the photo-electric cells 4 and 4*b* and microphone 29 of the three transmitting units 2, 29 and 2*b* in consecutive order as the discs 151 and 161 rotate in regular timing. In the position of the disc 151 of the drawing a circuit is completed to the input of transmitter 1 from the photo-electric cells 4 of the first scanning unit. When the disc 151 rotates farther the segment 152 will come in contact with brush 157 and complete a circuit from the microphone 29 of the center transmitting unit to the transmitter 1, and on still further rotation the segment 152 contacts the brush 159 and completes a circuit from the photo-electric cells 4*b* of the second scanning unit to the transmitter 1. The length of the metallic segment 152 is made to contact only one brush at a time and preferably to avoid as little delay as possible between the contacts when reception is on a visible screen at a receiving station. However, it is possible to lengthen the segment 152 just enough to cause two brushes to contact it for a brief period in order to impose a stronger current flow on the input of the transmitter 1** for synchronizing and also for actuating registering apparatus at receivers.

In FIG. 1 in the first transmitting unit a newspage is being scanned by scanner 2 but only a fractional part of it will be transmitted by the photo-electric cell 4 to the input of the broadcasting transmitter 1 during the period of the contact of the brush 155 of its circuit with the segment 152 of the rotating disc 151. And the fractional part of the newspage image is determined by the speed of the motor in the casing 47. At the center transmitting unit the microphone 29 will be in circuit with the transmitter 1 by means of its circuit being closed when the brush 157 contacts the segment 152 of the rotating disc 151 and after the newspage of the first unit has been cut out of circuit during the rotating of this disc. Only a fractional part of a co-related sound program will be transmitted during this period of the microphone 29 being in circuit with the transmitter 1, and due to the fast speed of the motor driving the disc 151 the microphone 29 will soon be back in circuit with transmitter 1 and there will be no loss detected in the reception therefrom when the speed of the rotation of the disc 151 is sufficient and the frequency of the transmitter is high enough. After the microphone 29 is out of circuit with the transmitter 1 then the third transmitter unit will be in circuit with the transmitter 1 by its brush 159 making contact with the segment 152 of the rotating disc 151. The scanning apparatus **2*b* at the third transmitting unit and the photo-electric cells 4*b* are the same type of apparatus as shown at the first transmitting unit 2**, but the period of oscillating the scanning may or may not be the same.

The object being scanned at the third transmitting unit is a sound record 250 having its recording lines more or less horizontally extended from side to side on its record material and one line under the other and with each recording line joined or broken at each ending from side to side in its continuation as set forth in my U.S. Patent No. 2,363,502. The sound record 250 may be a single sheet of paper, film or other material as has been set forth in said patent. Also, if desired, it may be a roll of record material containing a lengthy sound program thereon and moved along intermittently as has been set forth in said patent. In operation the sound record produces modulations caused by the scanning beam of scanner **2*b* tracing the sound recording lines (not shown) successively and the variations of radiating intensity reaching either one or both of the photoelectric cells 4*b* will cause modulations by the transmitter 1 in like manner as produced by the newspage 3*a*** of the first scanning unit. The functioning may be carried out with a single photo-electrical cell when the sound record is of small size and when of large width and depth there may be two as shown. Furthermore, more than two of the photo-electric cells may be used when the record is of large size.

Figures 5, 5A:
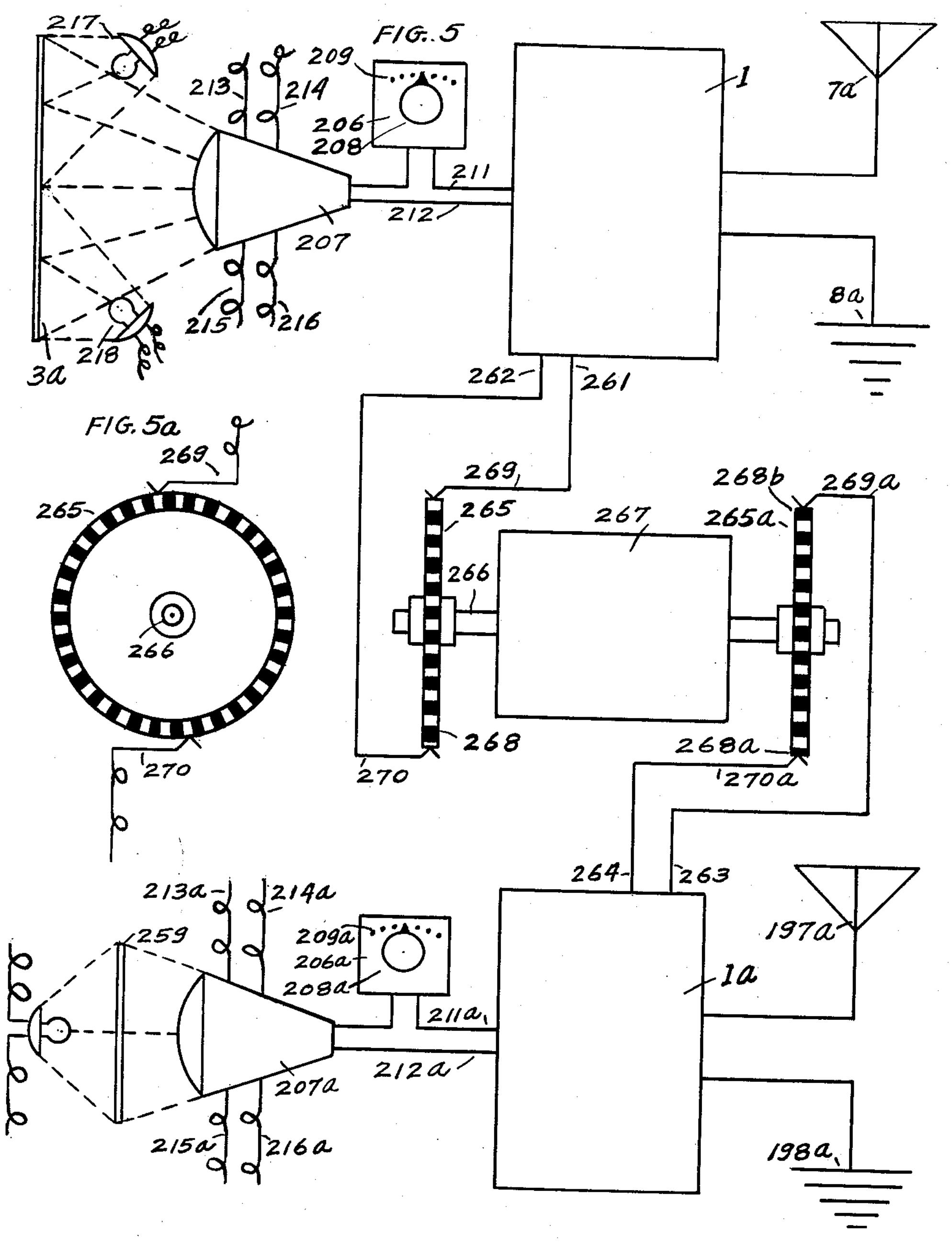
FIG. 5 shows multiple broadcasting at different frequencies and/or at near, or the same frequency, for avoiding interference in broadcasting and receiving
FIG. 5*a* is a face view of the commutator disc of FIG. 5.

Likewise, in re-creating a newspage any number of the photo-electric cells may be used. Furthermore, the transmitting may be accomplished by using an electronic camera type of television tube for the sound record and newspage. However, in the re-creating of the sound record 250 the sweeping of the scanning beam of scanner 2*b*, or the scanning beam inside of a camera type tube or the scanning beam of other types of apparatus may be used, will generally be spaced apart and not overlapping or joined as is generally the method in re-creating images. The spacing apart is to conform to the sound recordings as is usually the arrangement on a record of this type. The electrical modulation produced by the sound record 250 will be multiplexed with the newspage and microphone modulations but the reception thereof on a sound receiver will be without interruption when the frequency of the transmitter 1 is high enough to produce the result as is the purpose. Therefore, the functioning of transmitting the newspage and sound and receiving by separate receiving units is at an adequate frequency, preferably higher than is absolutely necessary in order to assure excellent reception of image and sound at all times. Control apparatus such as shown in FIGURE 5, as well as other types may be employed for breaking the circuit of the transmitter 1 of FIG. 1, or of the three input units of the transmitter according to the number of transmissions if desired.

In the use of the three transmitting units of FIG. 1 the newspage will be transmitted with co-related sound broadcasts by a speaker or by other means at the microphone 29 while the sound record 250 may contain a musical program to add further interest while the newspage 3*a* is being received. The microphone 29 of the second transmitting unit or the sound record 250 of the third transmitting unit may remain inactive part of the time during the transmitting of the newspage, or all three of the units may transmit during the entire period the transmitter 1 is functioning.

FIG. 2 shows the receiving set and apparatus shown as radio frequency stage 11 and audio stage 16, the numerals 12, 13, 14 and 15, respectively representing the usual control knobs therefor, while numeral 10 illustrates the ground. One of the output wires from the audio stage has circuit through a rotating circuit control apparatus 47, the same as shown in FIG. 1, for making and breaking the audio output current to the cathode ray tube 21 in like manner to controlling the circuits in FIG. 1. Switch 164 is shown in circuit with wiring 154 of the brush 155 for receiving images being sent from the photo-electric cells 4 of the first scanning unit of FIG. 1; moving the switch to wiring contact 166 will cause receiving from the center unit, moving the switch to wiring contact 167 will cause receiving from the photo-electric cells 4*b* of the third transmitting unit. The switch on contact with 166 or 167 gives sound reception. The image receiving tube 21 is projecting an image of the newspage being received and the smaller image tube in parallel circuit therewith is registering images on a photo-sensitized roll of film which may be moved along by apparatus.

FIG. 3 shows a front view of casing 251 enclosing all of the receiving apparatus of FIG. 2 except the cathode ray tube and its registering tube 21 which is omitted and has the switch arm 164 and the three contact points with 166 in circuit and which are arranged outside of the cabinet thereof.

A sound speaker 252 is in circuit with the output of the receiving unit therein in lieu of the cathode ray tube 21 of FIG. 2. One of the wires to the speaker 252 is direct from the output of the receiver while the other one is direct from the switch arm 164, the same as in FIG. 2.

It will be noted that the switch arm 164 is in contact with the point 166 which causes sound reception from the microphone of the second or middle transmitting unit of FIG. 1, as will be understood from the description of the apparatus of FIG. 2.

FIG. 4 is identical to FIG. 3 except the sound speaker 252 is in circuit with the output of the receiver through contact 167 in lieu of the contact 166. This gives reception from the high frequency sound record of the third transmitting unit of FIG. 1.

The two sound receivers of FIGURES 3 and 4 may receive simultaneously with the reception of the newspage 3*a* of FIG. 1 by the image receiving tube 21 of FIG. 2, or either of the two sound units may be received simultaneously with the reception of the newspage image. And in the reception of the newspage it may be on the end of the cathode ray tube 21 in lieu of projecting to the screen 23 shown in FIG. 2. Also, other types of image receiving apparatus may be used for the instant or substantially instant viewing of the image of the newspage.

In still further modification of the transmitting and receiving methods of FIGURES 1, 2, 3 and 4, purely electrical means may be used in lieu of the mechanical commutating means shown for performing equivalent transmitting and receiving results.

FIG. 5 illustrates a method and one type of control apparatus for enabling two or more high wattage transmitters from interfering in the transmitting in carrying out the method of the present invention.

Also, it enables two or more transmitters to broadcast on wave lengths of nearly the same frequency whether or not they are of high wattage, low wattage or of various wattages.

Furthermore, the method enables transmitting on the same wave length by two or more transmitters regardless of the wattage of either.

The transmitters controlled by this method may each be under separate ownership as separate stations or they be in one combination under one ownership.

Furthermore, the transmitters may be at great distances apart, in separate buildings in the same city, or in different cities. Again, they may be in the same building, the arrangement being to meet existing conditions.

The FIGURE 5 shows two of the transmitters and their associated parts and each part bears like reference numerals but the letter "*a*" is added to each numeral of the second or lower transmitting unit of the drawing. The upper transmitting unit illustrates the newspage 3*a* being flooded by light or invisible radiations indicated by numerals 217 and 218 and the radiations from the newspage are reflected to the television tube 207 having the usual oscilliating sweep wiring connections indicated by numerals 213, 214, 215 and 216 which causes transmitting of the newspage repeatedly by the transmitter 1 having time control means 206 having setting knob 208 with its timing circuit contacts 209, fully disclosed in FIG. 12 of my co-pending application S.R. No. 113,651, now U.S. Patent No. 3,085,096. The lower transmitting unit is shown transmitting a sound record 259 of the high frequency crosswise type as set forth in my Patent 2,363,502 and which is translated into electrical signals by a scanning beam as has been set forth in reference to the third transmitting unit of FIG. 1. In the present drawing the sound record 259 is flooded by the radiating lamp 260 and the variable radiations therefrom pass through the sound record to the plate (not shown) of the television tube 207*a* and the scanning beam inside of it scans successively the sound record image thereon which causes variable current output from the tube in a well known manner as will be understood by television engineers without further description. The output of the television tube 207 modulates the transmitter 1*a* as will be understood. This sound record being transmitted by transmitter 1*a* may be co-related to the newspage being transmitted by the transmitter 1, and it may be comments about the page of news being transmitted, the reading of comics that may be on the page, the announcing of late news not yet assembled on a new newspage, and for many other related purposes, some of which have been set forth hereinbefore. Furthermore, there may be a microphone in parallel circuit with the circuit of the television tube or to the input of transmitter 1*a* for use in lieu of the sound record, or for alternate use therewith, and such circuit means may have switches for the use of either sound transmitting means.

In operation of the control apparatus of the transmitters 1 and 1*a* of FIG. 5 one of the circuit wires of each of the transmitters is cut apart and the two ends 261 and 262 of transmitter 1 and the two ends 263 and 264 of transmitter 1*a* are extended to the outside of each of the transmitters. This severing apart of a wire of a vital circuit of the transmitters will cause stoppage of the transmitting as has been set forth in reference to FIG. 1. However, each of the circuits of the transmitters 1 and 1*a* are again closed by means of the functioning of the two discs 265 and 265*a* shown in edge view and mounted on the shaft 266 of the high speed motor 267 shown in side view. Each of the discs 265 and 265*a* have insulated segments 268 and 268*a*, respectively, as shown by the black lines and which are equally spaced around the circumference of each of the discs. The light segments of each of the discs 265 and 265*a* are preferably of bronze, copper, or some other suitable material and they form a part of each of the said discs. The wire 261 from transmitter 1 is joined to a brush 269 resting against the top of the disc 265 on a metallic segment thereof and a circuit is completed through the said wire, brush and disc and another brush 270 at the bottom of the disc and the other wire 262 extended from the transmitter 1. Identical parts and disc are shown in like arrangement with the transmitter 1*a* and like parts bear like numerals with the letter "*a*" added to each, but it will be noted that each of the brushes 269*a* and 270*a* are shown resting against insulated segments 268*a* and 268*b* of the disc 265*a*. In the arrangement of the brushes with the discs in the drawing the transmitter 1 will transmit the newspage while the sound record 259 of transmitter 1 will not be transmitted. However, this action is soon changed and the transmitter 1 will not transmit the newspage while the transmitter 1*a* will transmit the co-related sound record, and this alternating step is carried out continuously as long as the high speed motor 267 keeps each of the discs rotating, and the period of interrupting or opening and closing of either of the circuits of either of the transmitters 1 and 1*a* may be within the range of one sixth millionth of a second, more or less, depending on the volume of the newspage, the frequency of the transmitters and the frequency of the recording and re-creating of the sound record or of the sound from a microphone in combination therewith or in lieu of the sound record shown.

The reception of the newspage and the sound being transmitted from FIG. 5 may be by a combination image and sound receiver of the conventional type, or by a television receiver with commutating means as in FIG. 2 or equivalent electrical means for commutating. The slight loss of the transmitting periods caused by alternately transmitting the newspage and sound record will be so negligible due to the high frequency of each of the transmitters that it will not be noticable in the reception. And inasmuch as heretofore it has been impossible to broadcast from two or more powerful transmitters within close proximity to each without interference in receiving and/or to broadcast by two near frequencies or wave lengths and receive satisfactorily at all points therefrom, particularly about mid-way between, the control arrangement for the two transmitters 1 and 1*a* of FIG. 5 is revolutionizing.

It will be understood that a greater number of the rotating discs as shown in FIG. 5, in edge view, and in face view in FIG. 5*a*, may be employed when more than two transmitters are to be controlled. And such combinations may be with any of the transmitters shown in several drawings of the present method whenever there will be interference in the transmitting or reception due to the power, frequencies or wave lengths of any of the several transmitters that have been shown and described for transmitting simultaneously. The unnoticeable alternating speed in the transmitting and the receiving according to FIG. 5 produces equivalent results to transmitting and receiving simultaneously but has the advantage of providing a greater number of powerful transmitting stations than now permitted by the F.C.C. without interference. Also, it makes possible the licensing of a greater number of transmitters for all purposes in view of the fact wavelengths more closely together may be alloted in the same localities or within sending and receiving range of each without interference. The transmitting according to FIG. 5 is simultaneously inasmuch as the two transmitters function on high frequency and their periods of alternately transmitting is finely divided.

The method of my invention also provides for broadcasting from a newspage and the like in color as well as in black and white. The apparatus of FIG. 1 is suitable for color broadcasting and in such the image 3*a* will consist of a part of a newspage. One example being the headlines of the page for red or other color than black. The remaining part of said page will be in print for black reproduction without the headlines printed thereon and it will be scanned by the scanner 2*b* in lieu of the sound record 259. The headlines on page 3*a* and the remaining part of the page at the scanner 2*b* will be broadcast, alternately according to the method steps set forth in reference to FIG. 1. The receiving therefrom and developing into a colored page is shown in FIG. 7. Other modifications of the method are shown in FIG. 6 of my prior application Serial No. 482,156, and now abandoned, and such is applicable in addition to FIG. 1.

In FIG. 6 the numeral 271 indicates in general and enclosed in a casing the two rotating discs, motor and associated apparatus of FIG. 5 for controlling two transmitters in like manner to FIG. 5 but with each transmitter having three transmitting units with commutating means as shown in FIG. 1 and as described in reference thereto. The functioning of the commutating of the three transmitting units of each of the transmitters 1 and 1*a* is exactly as set forth in FIG. 1 and each of the parts bear like reference numerals and further reference of the commutating is not deemed necessary in view of the description of FIG. 1. However, the subject matter at each of the transmitting units is changed for effecting a method of transmitting colored newspages and a co-related colored moving picture. At the scanning unit 2 there is illustrated in edge view part of a newspage 272 broadcasting in one color and at scanning unit 2*a* is shown in edge view 273 part of the image matter of the first page in another color and in another color at unit 2*b* and indicated by the numeral 274. The three pages constitute a single page when the images are received on a single viewing screen of a receiver as will be set forth hereinafter.

At each of the scanning units 2*c*, 2*d*, and 2*e* of transmitter 1*a* there is shown in edge view a single moving picture film passing through the apertured gates 276, 277 and 278 by each of the scanning units 2*c*, 2*d* and 2*e*, respectively, and which functions for receiving colored images at receiving stations. The reel of film winds and unwinds from either of the reels 279 and 280 by suitable rotating and intermitting apparatus for moving the film strip after a scanning of each of the three images. The intermittent apparatus used may be one of suitable types, several of which are described in my U.S. Patent No. 2,299,738 granted October 27, 1942. In lieu of the reels of film shown the film strip 275 may be endless. Opposite scanning unit 2*c* part of an image will be on the film strip and another part of it will be opposite scanning unit 2*d* while the third part of it will be opposite the scanning unit 2*e* and in receiving all three of the parts of the image will be received on a single receiving screen of a receiver as one image of three different colors in the manner to the newspage received in three colors that is transmitted by the transmitter 1 having a like number of images as has been described.

In the transmitting of the newspage parts and the moving picture parts simultaneously the periods of transmitting of each image thereof may be varied as has been set forth in reference to the functioning of this type of apparatus in reference to FIG. 1. A minute part of either of the six images may be transmitted at a time or any other part thereof or the entire image of either of the six scanning units may be transmitted at a time and the number of repeats for each image may be varied to conform to the subject matter on the newspage represented in the three parts by numerals 272, 273 and 274. Also, the repeating may be for other reasons in receiving as has been set forth in reference to the several other figures. Furthermore, the moving picture film may not repeat the transmitting of the entire enactment thereon co-related to the newspage being transmitted, particularly in view of the fact a moving picture film strip is usually of great length and consists of many images and its one time transmitting period may be sufficient for the number of times the newspage has been transmitted and received repeatedly in carrying out the transmitting and receiving method of the invention. However, there may be occasions when the moving picture film strip will be repeated, particularly when it is of short length and consists of comic cartoons, etc. giving moving effects related to the newspage being transmitted.

FIG. 6*a* shows in face view each of the three parts 272, 273 and 274 of FIG. 6 which are on separate materials such as paper, film, etc., or even the copper, zinc or other plates such as used in the process of color printing of newspages. The three parts constitute a full newspage image in reception at a receiver. The part 272 shows the image matter at the upper part thereof and the part 273 shows the image matter at the center part thereof, while the part 274 shows the image matter at the bottom thereof. In the reception the several parts will be received as a single image and in three colors.

FIG. 6*b* shows in face view each of the three image frames 281, 282 and 283 on the moving picture film strip of FIG. 6. These three image frames constitute a single image in reception at a receiver. The several parts are at different locations on each of the frames of the film strip 275 in like manner to the parts of the newspage of FIG. 6*a*. In reception the several parts constituting a single moving picture frame will be received in three colors at the receiver.

From the foregoing description of FIGURES 6, 6*a* and 6*b* it will be understood that more than three parts of an image may be sent by either of the transmitters 1 and 1*a*, or by both transmitting simultaneously. Also, it will be understood that only two parts of an image may be sent by either or both of the transmitters. The number of different colors desired in the receiving will be determined by the number of transmitting units and parts of images employed for each of the transmitters and the frequency of each of the transmitters will be determined by the volume of image matter by totaling the volume of each of the several parts. Furthermore, a greater number of transmitters may be employed in the assembly in carrying out the spirit of the invention on a greater scale.

FIG. 6*c* shows the rotating disc, commutating parts, brushes, leads, etc. as shown in FIG. 6 and which has like reference numerals, but which has adjusting arms 284, 285 and 286 for the brushes 155, 157 and 159, respectively, of transmitter 1, and adjusting arms 287, 288 and 289 for the brushes 155*a*, 157*a* and 159*a*, respectively, of the transmitter 1*a*. By moving these brush arms it is possible to make adjustments so one of the brushes ahead of either of the contact segments 151*a* and 152*a* will be in circuit a fractional part of the time in which either of the said contact segments are in contact with the brushes they are just leaving or breaking circuit with. This will cause a stronger electrical flow into each of the transmitters 1 and 1*a* for a fractional period of the image transmitting period of each of the six image scanning units 2, 2*a*, 2*b*, 2*c*, 2*d* and 2*e*, and such functioning may be used for synchronizing transmitters with receivers at each scanning line or other part of or the full scanning of each image whenever the transmitters 1 and 1*a* are not otherwise provided with other synchronizing means in their circuits. And, in this connection it is desired to state that the transmitters 1 and 1*a* in FIG. 6 and the several other figures are diagrammatic illustrations and may have synchronizing signal means of any kind included therein as will be understood. It will be understood that synchronizing means are not altogether mandatory, as it is possible to transmit simple newspages and images without such means. However, the inclusion of synchronizing means of suitable kind with each of the transmitters of the drawings is highly desirable. And the inclusion of synchronizing means may be as a part of the transmitters and the diagrammatic illustrations may or may not indicate such means are therein. But as stated above, the transmitters indicated in the several drawings may be with the synchronizing means therein. The means shown in FIG. 6*c* is purely optional for use in lieu of other synchronizing means that may be in the transmitters.

In receiving colored images my method provides for creating a colored newspage, or a colored movie; or both alternately at different intervals in the reception. In the functioning of the receiver the image impulses received from either of the transmitters 1 and 1*a* of FIG. 6, the said image impulses may all be of black and white images transmitted for translating into colored images by the receiving method of FIG. 1 and/or each of the images transmitted by the apparatus of FIG. 6 may be in different colors at each of the scanners thereof. My method of producing colored images provides improvement and simplicity in the transmitting and receiving of colored images than complicated methods and apparatus which have heretofore been employed in producing a single program by television. And my new method of producing colored images by television may be used in the transmitting and receiving of single programs for further improving the art of television.

In FIG. 7 the receiving set of FIG. 2 is shown with a synchronous motor 290 and a color filtering disc 291 mounted on a metal disc 292 of the shaft 293 of the motor 290 which has wires 294 and 295 for connecting to a suitable electrical source. Connecting to the output of the scanning unit 16 of the image receiver there is shown wires 296 and 297 which connect to synchronizing means indicated in general by the numeral 298 and having an electro-magnetic pole 299 in juxtaposition to the shaft from disc 292 for controlling the speed of the filtering disc 291 by signals from the transmitter of FIG. 6 received from an output connection of the receiving unit 16 of the image receiver. The reception of the images on the receiving tube 21 of FIG. 7 will be the same as has been set forth in reference to FIGURES 2 and 6, and when it is tuned to the frequency of the transmitter 1 of FIG. 1, the parts of the newspage 272, 273 and 274 will be received alternately. The filtering disc 309 of FIG. 7 consists of different colors and as it rotates by the shaft 293 of the motor 290 the respective colors of the segments of the disc 309 are successively passed by the end of the cathode ray receiving tube 21 in exact timing in accordance to the transmitting periods of each of the transmitting units. Bolts 300 and 301, having nuts 302 and 303, respectively, hold the filtering disc 291 to the metal disc 292, and both discs are held on the shaft 293 of motor 290 by the nuts 304 and 305. The filtering disc is of glass or some other suitable material and is divided into equal segments each consisting of different colors for receiving the separate parts of the newspage or film transmitted by the units described therefor in reference to FIG. 6.

The successive receiving of the newspage parts by the apparatus of FIG. 7 gives alternate color combinations when viewing the face of the disc 291, having color filter segments 306, 307 and 308 as shown in FIG. 7*a* and the result is the viewing of a newspage in a combination of colors. The numeral 312 is the mounting hole for the disc.

FIG. 7*b* is a face view and a modification of the color disc of FIGS. 7 and 7*a* and two colors are indicated for the disc 309 by the two numerals 310 and 311. The numeral 312 indicates the mounting hole for the shaft 293 of FIG. 7. Still further color segments will be used when more colors are desired and the speed of the motor 290 will be compensated for keeping in unison with the motor 47 of FIG. 6.

Purely electronic colored receiving means may be used in lieu of the filtering discs of FIGURES 7*a* and 7*b*. Also, the images received therefrom may be registered on photographic film as shown in FIG. 2, and the film will be for colored photographing as is well understood in art of photography.

The reception in color also provides for multiple receiving consisting of two or more programs received simultaneously or substantially simultaneously as is shown in FIG. 8. In such the discs 291 and 309 of FIGURES 7*a* and 7*b* are divided into two sections, each of which receive and project from two separate receivers as shown in FIG. 8. Each receiver is indicated with like reference numerals with the letter "*a*" affixed to the second receiving unit.

FIG. 8*a* is a face view of a disc 31 having the two sets of colored segments and which is mounted on the shaft 293 of FIG. 8.

Inasmuch as several of the figures show photographic records for transmitting the images thereon according to the method of the present invention it is desired to show one type of apparatus for producing such records.

The FIG. 9 diagrammatically illustrates in side view a roll of paper 319 which contains a group of newspages printed thereon and mounted on the roller 320. The numerals 321 and 322 indicate frictional rollers through which the newspages pass when the shaft 323 and the pulley 324 mounted thereon is rotated by means of the belt 325 which engages the pulley 324 of the shaft 323 of the camera 327 for rotating the pulley 326 on the roller 321. An intermittently rotating structure 328 having a pulley 329 which is coupled to the pulley 330 of the driving apparatus of the camera 327 for moving a sensitized film (not shown) intermittently as will be understood by those experienced in the art of moving pictures. During the intermittent period of non-moving of the rollers 321, 322, 323 and 324, the newspage images on the sheet 332 of the roll 319 will be illuminated by the lamp 333 and the images of the newspages will be photographed in consecutive order by the camera 327. The photographic images registered on the film inside of the camera 327, which may or may not be on standard size movie film, will be developed and finished and the images may then be scanned and transmitted from the negative film strip obtained, or from separate framings thereof when severed apart by either of the apparatus shown in the several drawings. However, in the reception of images from a negative film the images will of necessity be translated into positive images on a television receiver by a simple knob control adjustment thereon as is well understood in the art of television. In lieu of using a negative film in transmitting a positive film or other positive print may be obtained for transmitting. Also a positive film may be made originally as will be understood. Therefore, my method includes transmitting images from negative or a positive registration whether they be photographic, newsprint or other reproductions. In lieu of the driving pulleys and belts shown gear wheels and other means may be employed.

It is within the scope of the invention to photograph single newspages not on a roll of paper, as in FIG. 9, for transmitting a single newspage image. And it will be understood without further drawings in view of the method step set forth in FIG. 9. The photographed images obtained as single images or as a series on a strip of material may be enlarged or decreased in size in the photographic step. And, if desired, the finished photographic images for transmitting may be completed automatically inside of the cameras.

For simplicity in explaining the method steps of my invention I have shown newspages and moving picture film in the several figures of the drawings, but it will understood that all other subject matter may be televised and received including people in person, etc. Also, it will be understood that television cameras may be used in each of the figures of the drawings in lieu of the flying spot scanners shown in FIGURES 1 and 6 and in lieu of the simple type of television camera tube shown in FIG. 5. Likewise, other types of receiving apparatus may be used than shown in the several drawings.

It will be noted that filtering means are not shown in FIG. 6 in illustrating the transmitting of the several component parts of a colored news page by the transmitter 1 and the several component parts of the moving picture film being transmitted by the transmitter **1*a***. This omission of the colored filters at each of the scanning units is due to the fact the newspage part at each of the scanning units is printed or photographed in its respective color which in itself serves as a filter. Likewise, each of the component parts of the moving picture film being scanned and televised is in its respective color and serves as its filter. However, it is within the scope of the invention to scan and transmit each of the component parts of the newspage images and the moving picture images for color reception even though each component part is in black and white, or other colors, when the receiver and its filtering disc of FIG. 7 is of proper segment colors and is properly arranged and synchronized for color reproduction to that desired for each of the component parts of the images being transmitted at FIG. 6, or at FIG. 1 when so desired to use it for television broadcasting with and without sound broadcasting therewith.

My color methods are illustrated by mechanical means solely for the purpose of illustrating in a simplified manner, but it is a purpose of the invention to employ purely electronic transmitting and receiving means, or a combination of electronic and mechanical apparatus in carrying out my method. In the latter means purely electronic television broadcasting apparatus may be used and the reception by electro-mechanical means as shown in FIGURES 2, 7 and 8. Also the broadcasting may be by electro-mechanical means as shown in the several drawings and the receiving by purely electronic means such as the conventional television sets now in use in homes. Furthermore, the receiving tube used for colored pictures may be of the present type now in use in homes and which have colored coating dots and the like responsive to three electronic beams scanning them inside of the receiving tube. However, the method of my invention is not limited to three scanning beams in receiving. Neither is the method limited to three television cameras each having different colored filters in front of their lenses in televising and broadcasting a play and other scenes in color effect. According to my method steps for color broadcasting, such as shown in the upper units of FIG. 6, wherein newspages are being broadcast, the black and white portion only may be received on a selective receiver as shown in FIG. 2. The other two scanning units of this figure may be broadcasting in color, an example being red at one unit and blue at another which may be a cartoon of the page in color. The black and white unit will contain the news in print in such an arrangement. Likewise, when the purely electronic type of television tubes are used in FIG. 6, or in FIG. 1 when it is used for color broadcasting, in lieu of the flying spot scanners, then filters will be used in front of the lenses and acts and other scenes will be broadcast in color effects and received in color effects by the receiver of FIG. 7. Also only black and white or monochrome images may be received without the filtering disc of FIG. 7 being used, and in receiving by the selective receiver of FIG. 2, the black and white part only may be received. Further drawings and descriptions therefor are not deemed necessary and it is believed will be understood by television engineers and others experienced in the art.

Still further modifications may be made in the broadcasting arrangements of the several drawings to meet results desired. Among such is combining the scanning and commutator units of FIG. 1, or the upper unit groups of scanning units of FIG. 6 and the commutator with FIG. 5 and connecting the wiring 153 and 163 of FIG. 1 and the same wiring numerals 153 and 163 of FIG. 6 to the wiring leads 211*a* and 212*a* of the transmitter 1*a* of FIG. 5. In using either of the units of FIG. 1 or FIG. 6 connected to this transmitter of FIG. 5 then the television camera tube and its timing control box 208*a* is dispensed with. In such a combination the apparatus of FIG. 5 may be employed for color broadcasting, in one example the transmitter 1 will broadcast a single image or scene of the grouping which may be in black and white while the transmitter 1*a* will transmit the several color effects of a colored scene, or newspages, and in the case of all four of the televising units broadcasting a single scene then television cameras will be used in lieu of the flying spot scanners. In tuning for receiving from this arrangement the complete color image may be received, from transmitter 1*a* or the black and white received if tuned to transmitter 1. The timing controls 208 and 208*a* are not required in broadcasting from FIG. 5 and generally will not be used although they have use in repeating broadcasts of facsimile matter.

Other combinations of the several transmitting units of the drawings may be made in carrying out the spirit of my invention.

In the claims:

1. The method of broadcasting colored television images which consists of, developing high frequency video signals from each of two or more colored component parts of a program, transmitting each of the colored part signals interleaved at different frequency one to another and within the range of persistence of vision in reproducing on a receiver, receiving said colored part signals in adequate sequence for reproducing the images in color and receiving said signals for reproducing the images in monochrome or black and white as may be chosen.

2. The method of broadcasting and receiving colored images and monochrome or black and white images from scenes which consists of, developing and transmitting colored image signals from scenes by filtering the colors from each of the scenes separately and transmitting each interleaved in close sequence and desired frequencies and alternately developing and transmitting monochrome or black and white signals from the same scenes at different frequency and receiving the colored signals on a colored television receiver and the monochrome or black and white signals on conventional receivers for television reception.

References Cited in the file of this patent

UNITED STATES PATENTS

| | | |
|---|---|---|
| 1,194,820 | Colpitts | Aug. 15, 1916 |
| 1,945,626 | Baird | Feb. 6, 1934 |
| 2,010,307 | Leishman | Aug. 6, 1935 |
| 2,268,001 | Von Felgel-Farnholz | Dec. 30, 1941 |
| 2,354,199 | Collins | July 25, 1944 |
| 2,423,769 | Goldsmith | July 8, 1947 |